(12) United States Patent
Gilbert et al.

(10) Patent No.: US 6,771,595 B1
(45) Date of Patent: Aug. 3, 2004

(54) APPARATUS AND METHOD FOR DYNAMIC RESOURCE ALLOCATION IN A NETWORK ENVIRONMENT

(75) Inventors: Matthew M. Gilbert, Beaverton, OR (US); Douglas D. Boom, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/387,077

(22) Filed: Aug. 31, 1999

(51) Int. Cl.[7] ............................................. H04L 12/00
(52) U.S. Cl. ..................... 370/229; 370/412; 370/419; 710/56
(58) Field of Search ................................. 370/229, 410, 370/444, 455, 412, 413, 419, 420, 463, 465, 230, 230.1, 232, 234, 250, 252, 253; 711/148, 150, 170; 710/29, 52, 56

(56) References Cited

U.S. PATENT DOCUMENTS

| | | | |
|---|---|---|---|
| 5,046,039 A | * | 9/1991 | Ugajin et al. |
| 5,892,980 A | * | 4/1999 | Tal et al. |
| 5,916,309 A | * | 6/1999 | Brown et al. |
| 5,920,732 A | * | 7/1999 | Riddle |
| 6,016,503 A | * | 1/2000 | Overby, Jr. et al. |
| 6,058,460 A | * | 5/2000 | Nakhimovsky |
| 6,073,190 A | * | 6/2000 | Rooney |
| 6,094,695 A | * | 7/2000 | Kornher |
| 6,115,356 A | * | 9/2000 | Kalkunte et al. |
| 6,154,465 A | * | 11/2000 | Pickett |
| 6,243,769 B1 | * | 6/2001 | Rooney |
| 6,314,103 B1 | * | 11/2001 | Medhat et al. |
| 6,336,156 B1 | * | 1/2002 | Chiang |
| 6,385,672 B1 | * | 5/2002 | Wang et al. ................. 710/56 |
| 6,473,845 B1 | * | 10/2002 | Hornung et al. |
| 2003/0198241 A1 | * | 10/2003 | Putcha et al. .............. 370/419 |

* cited by examiner

*Primary Examiner*—Seema S. Rao
*Assistant Examiner*—Robert C Scheibel
(74) *Attorney, Agent, or Firm*—Marger Johnson & McCollom, PC

(57) ABSTRACT

A resource controller allocates a portion of network memory to a receive path for receiving data and to a transmit path for transmitting data. Network traffic patterns are monitored including the amount of data received and transmitted by the network processing device. The resource controller determines based on the monitored traffic patterns if the transmit path or receive path has allocated a desire amount of network memory. The resource controller removes underutilized resources in the receive or transmit paths. Removed network memory is returned to a resource pool and made available for allocation to another receive path or transmit path that needs additional network memory. An artificial intelligence system predicts future network resource allocations to further increase the efficiency of the resource controller's network resource allocation. The resource controller can monitor multiple network interface cards with the resource controller dynamically reallocating network resources amongst the multiple network interfaces.

19 Claims, 6 Drawing Sheets

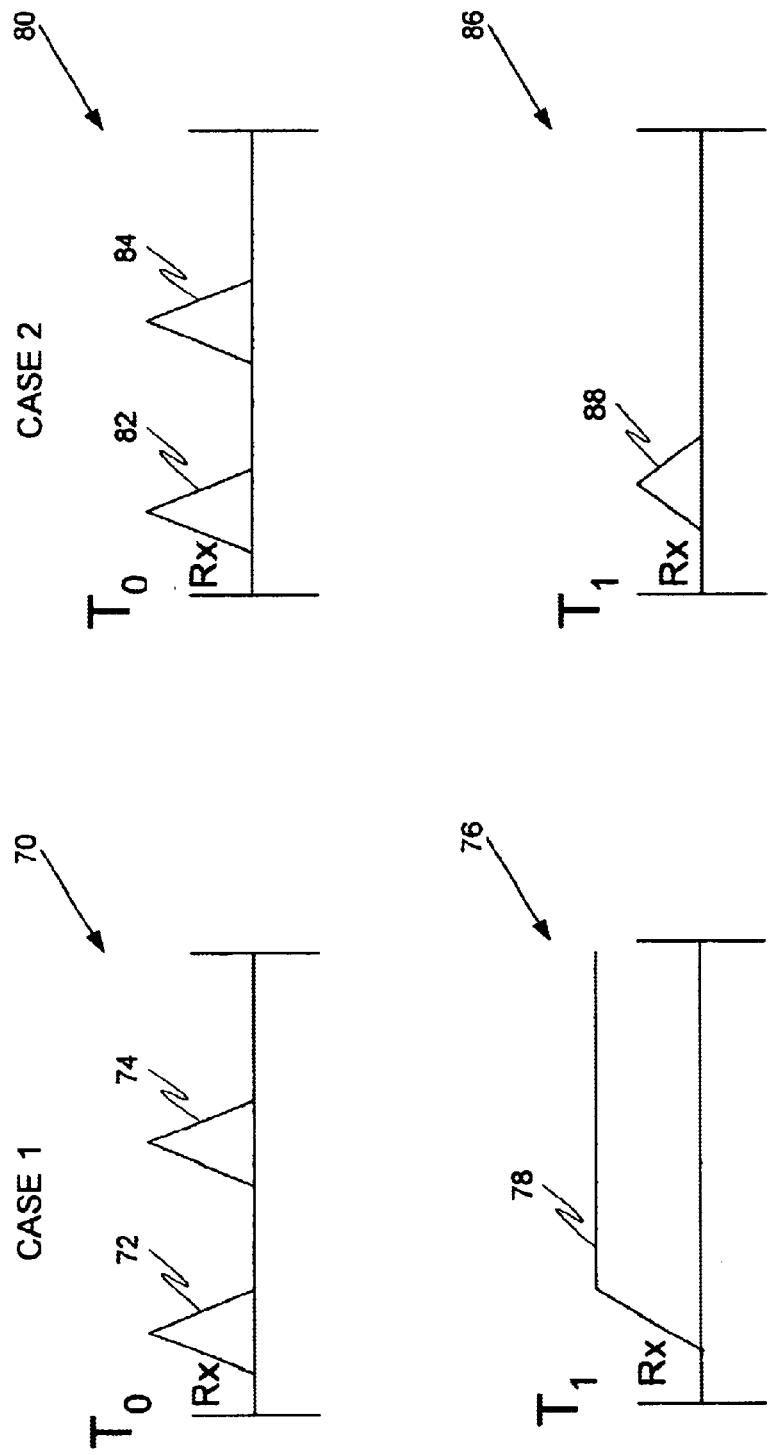

US 6,771,595 B1

APPARATUS AND METHOD FOR DYNAMIC RESOURCE ALLOCATION IN A NETWORK ENVIRONMENT

BACKGROUND OF THE INVENTION

This invention relates generally to a network processing device and more particularly to a system for dynamically allocating resources in the network processing device.

A network processing device is any computer system that communicates over a network. The network processing device can be a personal computer (PC), network server, portable palm computer, router, etc. For simplicity, the phrase "network processing device" is used interchangeably below with the phrase "host computer."

A portion of memory in a host computer is allocated to transmitting and receiving packets over a network. This portion of memory is referred to generally as network memory, or network resources. A predetermined amount of network memory is permanently allocated at host computer bootup for receiving packets over the network. When the host computer has data ready for transmitting, a protocol stack requests allocation for some portion of the remaining network memory. Network control software then manages and allocates the remaining network memory for transmitting packets over the network. One example of commercially available network control software uses event control blocks (ECBs) to allocate network memory to different transmit tasks in a host computer.

Current network control software does not efficiently allocate network resources. For example, some network resources are dedicated to only one specific transmit or receive task. For example, a predetermined amount of network resources are dedicated to receiving packets when the host computer drivers are loaded. These network resources are under utilized when that transmit or receive task is not currently being performed.

The network control software also allocates network memory on a first come-first serve basis. Software applications that need to transfer data over the network either fail or are delayed if network memory has already been allocated to other software applications.

All available memory resources can also be allocated to one or more small network tasks that only require a small portion of the network memory. Other larger tasks that require a substantially larger amount of the network resources, but request network resources after the smaller network tasks, are either denied network memory allocation or are not allocated enough resources to perform network tasks efficiently.

According, a need remains for more effectively managing and allocating network resources in a network processing device.

SUMMARY OF THE INVENTION

Network resources are dynamically allocated in a network processing device. An amount of the network resources are allocated for receiving data in the network processing device and an amount of the network resources are allocated for transmitting data from the network processing device. Network traffic patterns are then monitored in the network processing device. The amount of network resources previously allocated for receiving data and transmitting data are dynamically reallocated according to the monitored network traffic patterns.

The foregoing and other objects, features and advantages of the invention will become more readily apparent from the following detailed description of a preferred embodiment of the invention, which proceeds with reference to the accompanying drawings.

BRIEF DESCRIPTION OF THE DRAWINGS

FIG. 5 is a timing diagram showing a first example of how the expert system in FIG. 4 predicts network traffic patterns.

FIG. 6 is a timing diagram showing a second example of how the expert system in FIG. 4 predicts network traffic patterns.

DETAILED DESCRIPTION

Figure 1:
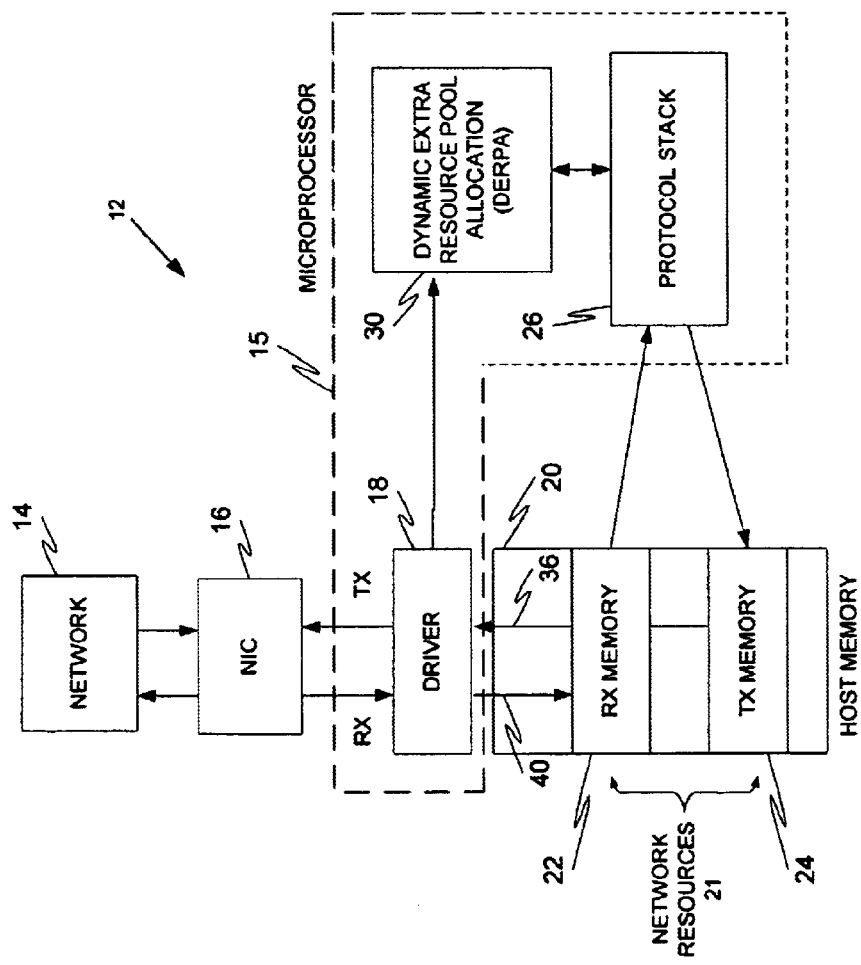
FIG. 1 is block diagram of a network processing device (host computer) including a dynamic extra resource pool allocation (DERPA) system according to the invention.

FIG. 1 shows some of the software and hardware components used in a network processing device (host computer) 12 for transmitting and receiving data over a network 14. The invention comprises a dynamic extra resource pool allocation (DERPA) system 30 used in the host computer 12 to more effectively allocate network resources. The DERPA system 30 can be installed on any host computer 12 that communicates with a network. For example, the DERPA system can be used in a personal computer (PC), network server, computer mainframe, network router, network switch, portable palm computer, etc.

In one example, the DERPA system 30 is implemented in software and typically resides between the data link layer (layer 2) and the network layer (layer 3) in the Open Systems Interconnection (OSI) model. However, the DERPA system 30 can be implemented in other software applications, or implemented in hardware or firmware in the host computer 12.

The host computer 12 includes host memory 20, driver software 18 and protocol stack software 26 used for transferring data between the host memory 20 and a network interface card (NIC) 16. The driver software 18, DERPA software 30 and protocol stack software 26 are usually run in one or more microprocessor(s) 15 in the host computer 12. The NIC 16 couples the network 14 to host computer 12. The network 14 is typically a local area network (LAN) or wide area network (WAN) connected to other network processing elements (not shown), such as other personal computers, servers, switches, or routing devices.

Network resources 21 in host memory 20 are reserved for transferring data between the host computer 12 and the network 14. Some portions of the network resources 21 are allocated as receive memory (RX memory) 22 and used by the host computer 12 to receive packets from the network 14. Other blocks of network resources 21 are allocated as transmit memory (TX memory) 22 and used by the host computer 12 to transmit packets over the network 14.

The protocol stack 26 shares the pool of network resources 21 with the driver 18. Whenever data needs to be transmitted from the host computer 12 to the network 14, the protocol stack 26 requests allocation of TX memory 24. The packets are loaded into the allocated TX memory 24. The driver 18 sends the packets from TX memory 24 to the NIC 16. The NIC 16 then transmits the packets over the network 14. When data is received from the network 14, the driver 18 loads the received packets on NIC 16 into allocated portions of RX memory 22. The protocol stack 26 then processes the received packets in RX memory for a particular software application.

The DERPA system 30 works with the driver 18 and protocol stack 26 to run in the host computer 12 and dynamically allocate and reallocate the pool of network resources 21 to RX memory 22 and TX memory 24 according to network traffic patterns.

Existing network control software is used for tracking the network resources 21. Network Control software is known to those skilled in the art and is therefore not described in further detail. In one example, the DERPA system 30 operates in conjunction with the Netware program produced by Novel, Inc. Netware tracks network resources using event control blocks (ECBs) that correspond with blocks of host memory 20.

Figure 2:
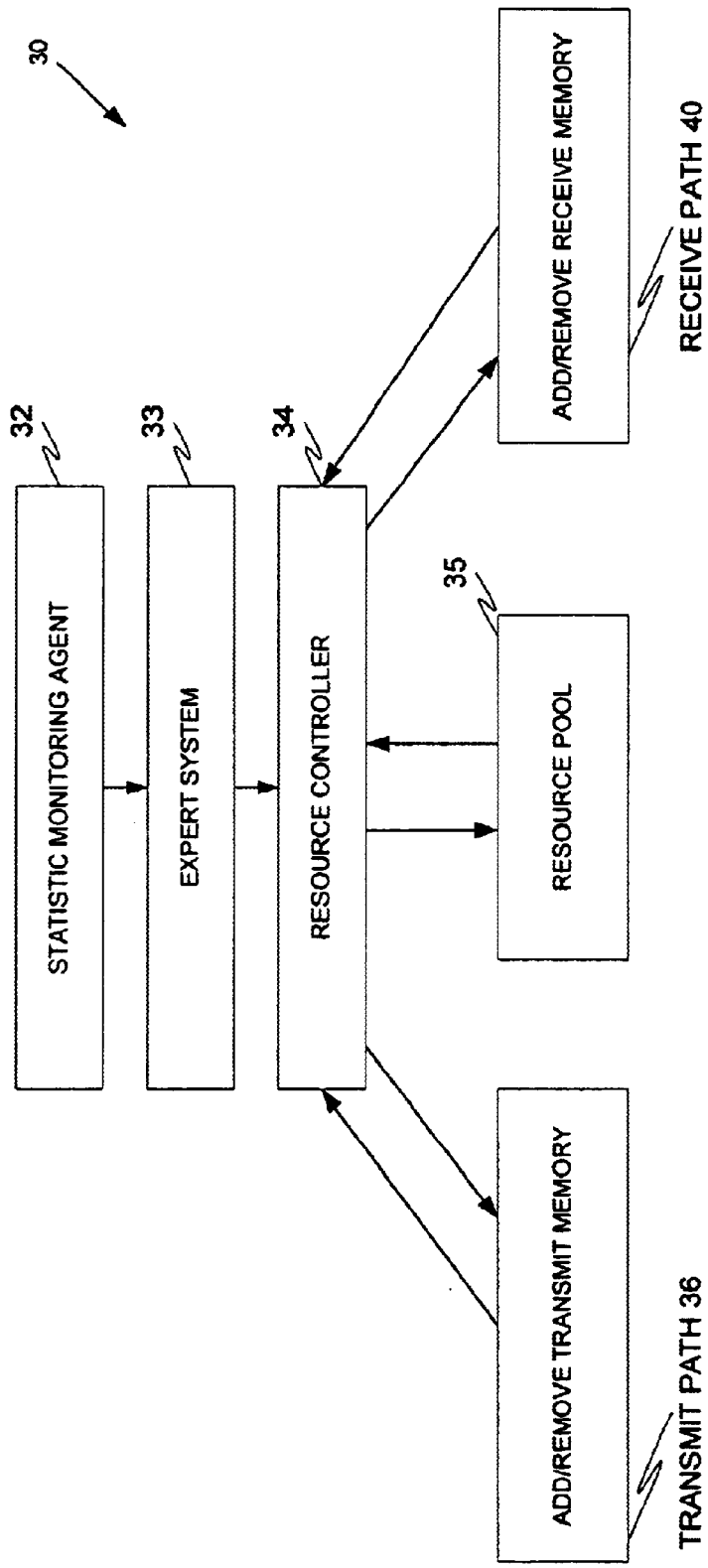
FIG. 2 is detailed block diagram of the DERPA system shown in FIG. 1.

FIG. 2 is a detailed block diagram of the DERPA system 30 shown in FIG. 1. Referring to FIGS. 1 and 2, the DERPA system 30 includes a statistic monitoring agent 32 that monitors network traffic patterns tracked in the NIC 16. A resource controller 34 controls a resource pool 35 that identifies what network resources 21 are available for allocation as TX memory 24 and RX memory 22. In one example, the resource pool 35 is a data structure that maintains a set of ECBs that correspond with blocks of network resources 21. The resource controller 34 adds or removes TX memory 24 for a transmit path 36 in the driver 18 and correspondingly adds or removes RX memory 22 for a receive path 40 in the driver 18.

The statistic monitoring agent 32 monitors network traffic over the NIC 16. For example, the NIC 16 may comprise a commercially available Ethernet card that keeps statistics on the number of frames received and transmitted over the network 14. The statistic monitoring agent 32 continuously monitors the number of transmitted and received network packets by accessing the network traffic statistics maintained by the NIC 16.

An expert system 33 is used by the resource controller 34 to allocate network resources according to predicted future traffic patterns. Future resource allocation is based on traffic patterns currently being monitored by the statistic monitoring agent. For example, a client workstation may request a network server to download an operating system over the network for client bootup. The expert system 33 monitors the network traffic on the server. The expert system 33 identifies a traffic pattern where a relatively small number of receive packets are received by the server from the client workstation (client workstation requesting download of operating system from the network server). This traffic pattern is followed by a large number of transmit packets (network server transmitting the operating system to the client workstation).

The expert system 33 knows after seeing this same traffic pattern on different occasions that a certain sequence of received or transmitted packets is usually associated with an operating system download operation. After detecting the network traffic pattern for a system download request, the expert system 33 automatically directs the resource controller 34 to allocate more TX resources 24. The network server will then have enough allocated TX memory 24 to efficiently transmit the operating system to the client workstation.

The expert system 33 identifies traffic patterns for any number and combination of different network pattern criteria. For example, as discussed above, the expert system 33 predicts future traffic patterns according to the number of packets received and transmitted. The expert system 33 can also predict future traffic patterns based on the time periods between different receive or transmit packets, the order in which different packets are received or transmitted from the host computer, and the source and destination of network packets.

Figure 3:
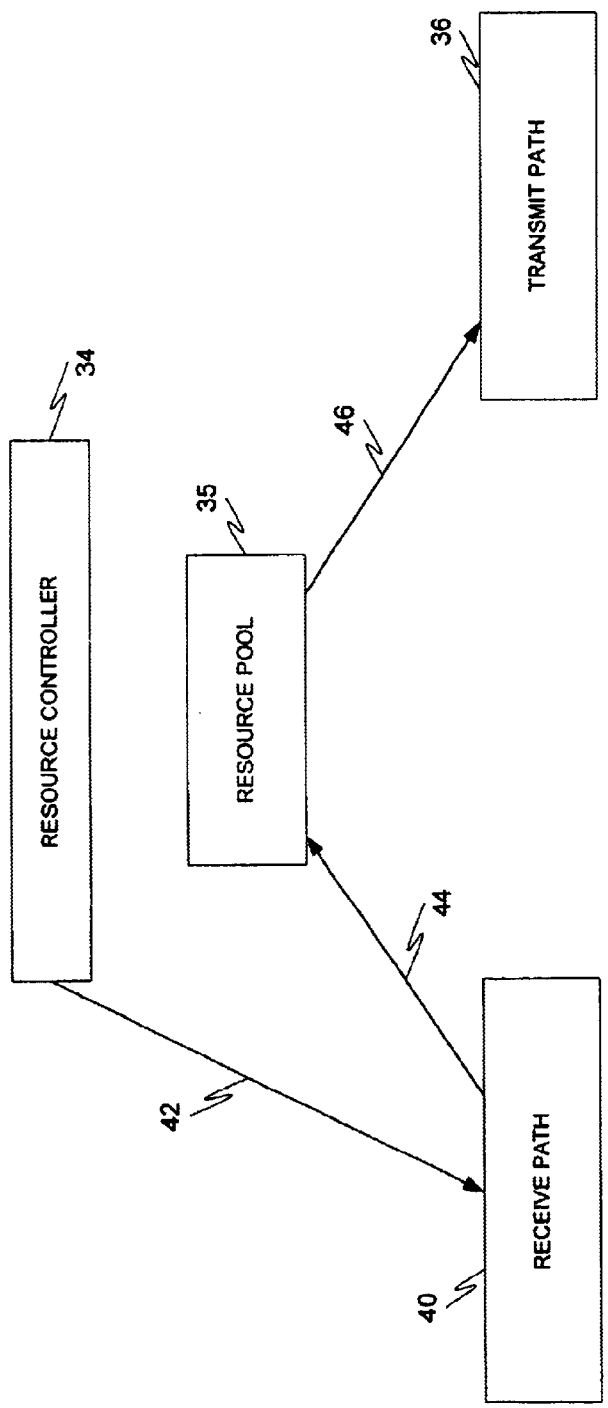
FIG. 3 is block diagram showing one example of how the DERPA system reallocates network resources.

FIG. 3 shows an example of how the resource controller 34 reallocates network memory resources from the receive path 40 to the transmit path 36 of driver 18 (FIG. 1). Referring to FIGS. 1 and 3, the resource controller 34 in step 42, determines the receive path 40 is currently allocated too much RX memory 22. Based on the currently monitored network traffic, the resource controller 34 determines the receive path 40 is not currently receiving packets, is receiving packets but does not need all currently allocated RX memory 22 or that the transmit path 36 needs more TX memory 24 than what is currently allocated.

The resource controller 34 instructs the receive path 40 to transfer a specified number X of RX memory 22 back to the resource pool 35. The value X typically corresponds to a number of blocks of RX memory 22. The receive path 40 in step 44 goes idle and moves the X amount of RX memory 22 to the resource pool 35. The additional resources taken from the receive path 40 are now available for allocation to transmit path 36.

In step 46, the protocol stack 26 requests TX memory 24 from the resource pool 35. Because there is now additional network memory available in resource pool 35, a larger amount of TX memory 24 can be allocated to the transmit path 36. The resource controller 34 tracks the amount of TX memory 24 added to the transmit path 36 from the resource pool 35. Any portion N of the available network resources 21 in resource pool 35 can be added to the transmit path 36. The TX memory 24 is then used to transmit packets from the host computer 12 over the network 14.

There are several alternative ways in which the resource controller 34 can reallocate memory resources 21. For example, the resource controller 34 might not use the resource pool 35 as an intermediary to reallocate network resources 21. Instead, the resource controller 34 may remove either TX memory 24 or RX memory 22 directly from the transmit path 36 or receive path 40, respectively. The removed resources are then reallocated directly to the other transmitter receive path.

In another embodiment, host memory 20 is used to dynamically allocate resources to the resource pool 35 according to network traffic patterns. Dynamic reallocation of host memory 20 with the resource pool 35 can be conducted in combination with receive path 40 and transmit path 36 reallocation. In this case, the resource controller 34 may first look to the host memory 20 for additional memory resources that need to be allocated to the resource pool 35. If the host memory 20 does not have the necessary resources, the resource controller 34 could then take resources from the appropriate transmit path 36 or receive path 40. Alternatively, the resource pool 35 is dynamically allocated resources from the host memory 20 instead of removing resources directly from the transmit path 36 or receive path 40.

The DERPA system 30 can allocate a pool of resources directly from host memory 20 that is outside the knowledge of protocol stack 26 or the scope of network resources 21. The DERPA system 30 uses the same network traffic pattern criteria to control how these resources are allocated as if they were network resources 21. This extension is controlled by the resource controller 34 and works best when the network traffic is to be copied from protocol stack 26 into the network resources 21 of the driver 18. Because this type of resource allocation works independently of the protocol stack 26, DERPA 30 can use any technique to allocate resources and is not limited to a resource allocation scheme dictated by the protocol stack 26.

The resource controller 34 usually checks to see if there are sufficient unallocated resources in the resource pool 35 before removing resources from the transmit path 36 or receive path 40. If the resource controller 34 determines there are sufficient network resources 21 available in the resource pool 35, no network resources 21 are removed from the transmit or receive path. The resource controller 34 may determine that the resource pool 35 has only a portion of the total resources currently needed by the receive path 40 or transmit path 36. The resource controller 34 then removes from the other receive or transmit path only that amount of network resources 21 needed to reach the total amount of needed network resources.

Figure 4:
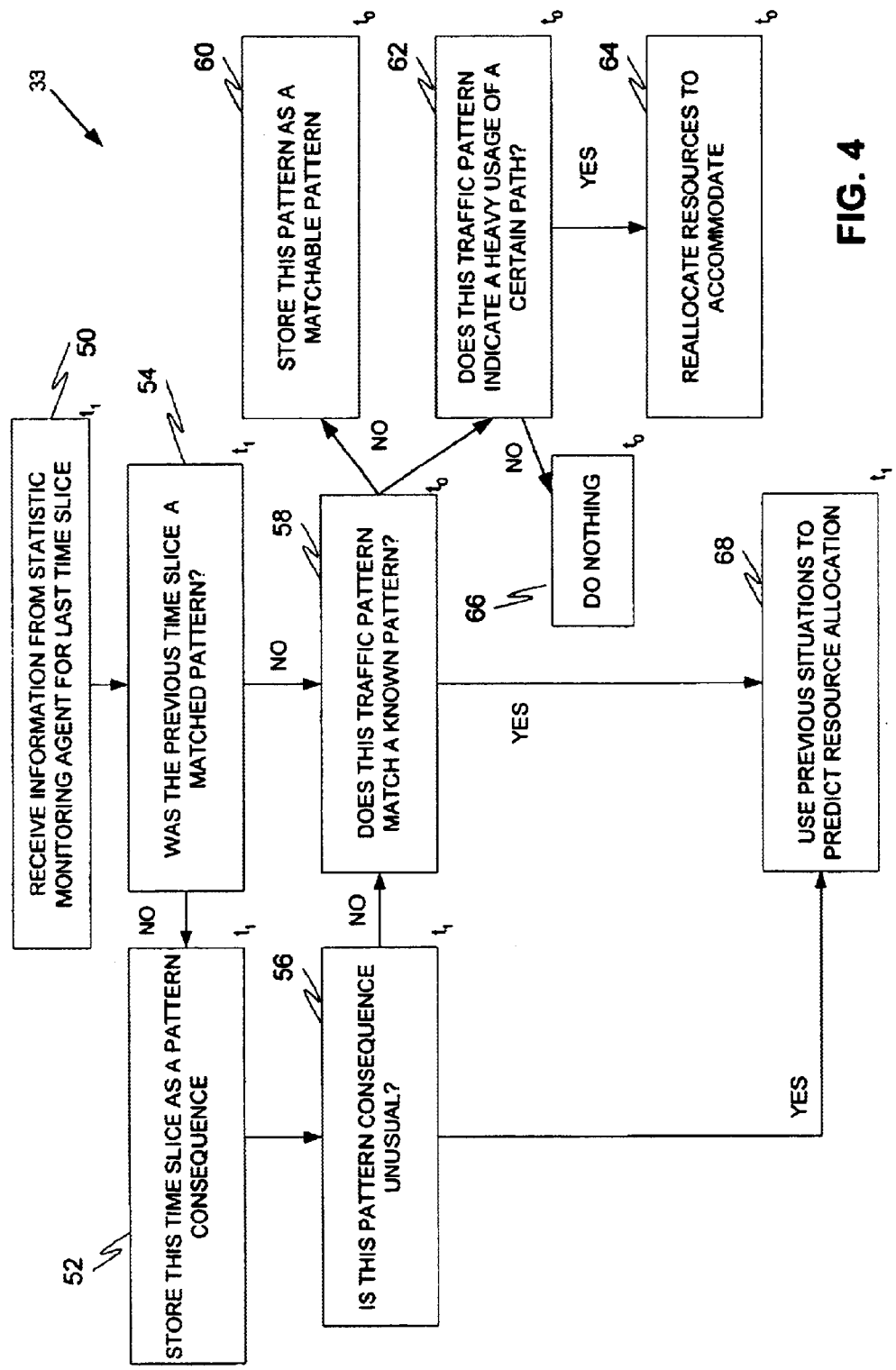
FIG. 4 is a flow diagram showing how an expert system is used with the DERPA system.

FIG. 4 shows an example of how the resource controller 34 uses the expert system 33 (FIG. 2) to reallocate network resources 21 between the transmit path 36 and the receive path 40. Referring to FIGS. 2 and 4, the expert system 33 receives information from the statistic monitoring agent 32 for a time slice beginning at time t1 in step 50. A time slice may be any time period defined by the resource controller 34. For example, the time slice may identify network traffic statistics of the host computer 12 for a one second time interval.

Step 54 determines whether the previous time slice beginning at time t0 is a matched pattern. A matched pattern is a network traffic pattern that has been previously received by the statistic monitoring agent 32. If the previous time slice is not a matched pattern, step 58 determines if the traffic pattern in the time slice at time t0 matches a known pattern. If the traffic pattern at time slice t0 matches an already know pattern, step 68 predicts allocation of network resources 21 (FIG. 1) for the next time slice according to a previously known traffic pattern that matches time slice t0.

If the traffic pattern in time slice t0 does not match a known traffic pattern, step 60 stores the traffic pattern for time slice t0 as a matchable pattern. Step 62 then determines whether the traffic pattern for time slice time t0 indicates heavy usage in either the transmit path 36 or receive path 40. If the traffic pattern for time slice t0 does not indicate heavy network usage, the expert system 33 in step 66 does not reallocate network resources 21. However, if the traffic pattern in time slice t0 indicates heavy resource usage for a particular transmit path or receive path, step 64 reallocates network resources 21 to accommodate the identified heavy network traffic.

The expert system 33 then jumps back to step 50 and takes another time slice beginning at time t2 from the statistic monitoring agent 32. The next time slice is analyzed in relationship to the previous monitored time slices to predict further traffic patterns and adaptively allocate memory resources in the host computer.

Referring back to step 54, if the previous time slice at time t0 is a matched pattern, the current time slice t1 is a pattern consequence. A pattern consequence is the traffic pattern that typically follows a known previous matched traffic pattern. For example, the pattern consequence of a matched traffic pattern of two small groups of receive packets spaced 200 milliseconds apart, may be a continuous burst of 1000 receive packets in the next time slice t1. The 1000 receive packet pattern in time slice t1 is stored as a pattern consequence in step 52.

The expert system 33 uses the stored pattern consequences to reallocate network resources. For example, two small groups of receive packets spaced 200 milliseconds apart may be detected in a time slice occurring at a later point in time. The expert system 33 would cause the resource controller 34 to reallocate resources to accommodate the 1000 receive packets that are likely to be received in the next time slice. Step 56 determines if the pattern consequence is unusual. The expert system 33 may identify a specific pattern consequence that usually follows a given matched pattern. If the current pattern consequence is substantially different from the pattern consequence that usually follows a given matched pattern, step 56 discards the unusual pattern consequence and uses the usual pattern consequence in step 68 to reallocate resources.

For example, ninety percent of the time after a certain matched pattern, the host computer 12 receives a large group of receive packets. However, about ten percent of the time after that same matched pattern, the host computer 12 only transmits a small group of packets. The expert system 33 ignores the small pattern consequence and predicts resource allocation based on the more common larger pattern consequence. If the pattern consequence at time t1 is not unusual in step 56, the expert system 33 jumps to step 58.

FIG. 5 is a timing diagram showing a first example of how the expert system 33 operates. Referring to FIGS. 4 and 5, a time slice 70 starts at time t0. The time slice 70 includes two relatively short bursts of receive packets 72 and 74. The next time slice 78 at time t1 includes a relatively long continuous bust of receive packets 78. The expert system 33 in step 54 determines that the time slice before time slice 70 is not a matched pattern. Step 58 determines that the traffic pattern for time slice 70 does not match a know pattern. The time slice 70 is then stored as a matchable pattern in step 60.

Starting with the next time slice 76, step 54 determines that the previous time slice 70 is a matched pattern. The traffic pattern 78 for time slice 76 is then stored as a pattern consequence in step 52. Step 56 determines that the pattern consequence 78 is not unusual. Accordingly, the time slice 76 is used to predict future network resource allocation. Time slice 76 indicates a large receive packet traffic pattern. Thus, the next time a traffic pattern similar to time slice 70 is detected, the expert system 33 predicts heavy receive traffic in the next time slice. In turn, the expert system 33 causes the resource controller 34 to add more RX memory 22 (FIG. 1) for the next time slice.

FIG. 6 is a second timing diagram showing another example of the operation of the expert system 33. Referring to FIGS. 4 and 6, the time slice 80 starts at time t0 and again includes two relatively short busts of receive packets 82 and 84. However, the next time slice 86 at time t1 includes a relatively short bust of receive packets 88. The expert system 33 in step 54 determines that the time slice before time slice 80 is not a matched pattern. Step 58 determines that the time slice 80 at time t0 matches a known traffic pattern. Step 68 uses the previous pattern consequence 76 (FIG. 5) to predict the resource allocation.

Starting again with time slice 86, step 54 determines that the previous time slice 80 is a matched pattern. The pattern 88 in time slice 86 is stored as a pattern consequence in step 52. Step 56 determines that the pattern consequence 88 is unusual. For example, the expert system 33 determines the traffic pattern that usually follows time slice 80 is similar to pattern consequence 78 (FIG. 5). Accordingly, another pattern consequence (e.g., pattern consequence 78) is used in step 68 to predict resource allocation at time t1.

Figure 7:
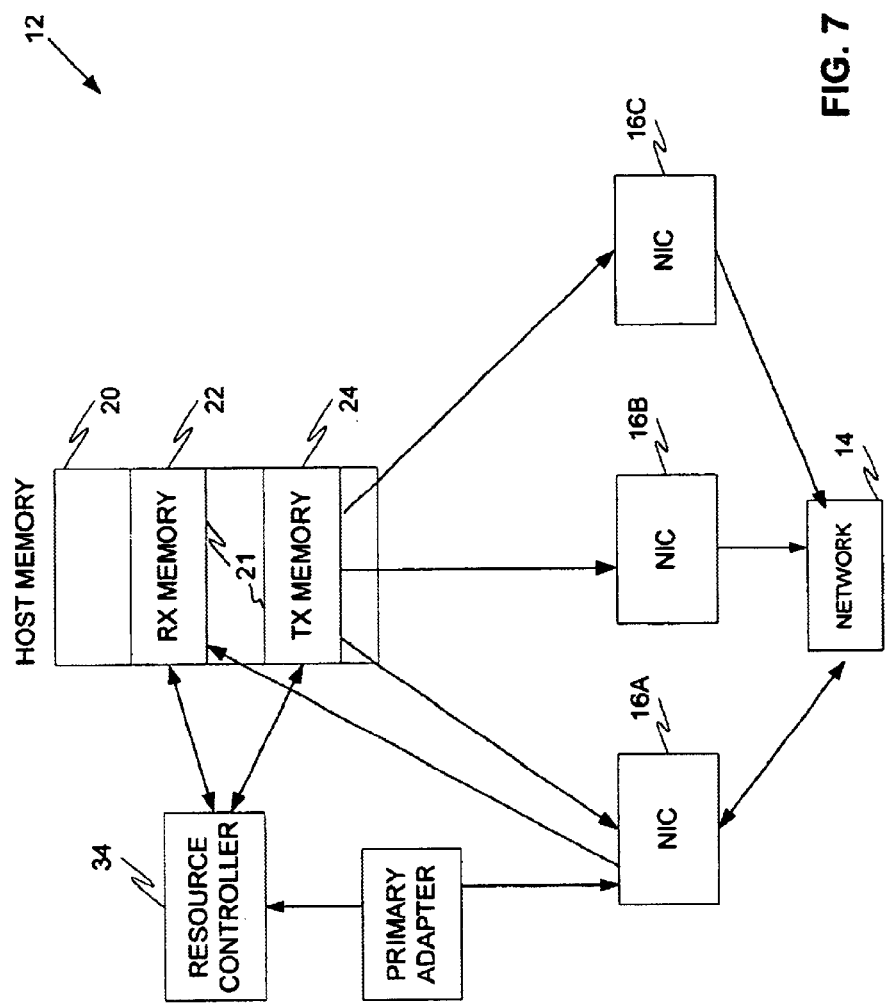
FIG. 7 is a block diagram showing how the DERPA system performs adaptive load balancing (ALB) with multiple network interface cards.

FIG. 7 shows another embodiment of the invention used for adaptive load balancing (ALB). The host computer 12 includes multiple NICs 16A, 16B and 16C. Only one of the NICs, say 16A, receives packets from the network 14. However, all three NICs 16A, 16B and 16C transmit packets over the network 14. In previous load balancing systems, each NIC 16A, 16B, and 16C is allocated the same amount of TX memory 24 and RX memory 22. Since NICs 16B and 16C only transmit packets, the RX resources allocated to NICs 16B and 16C were wasted. The resource controller 34 prevents RX memory 22 from being allocated to the two NICs 16B and 16C that only transmit packets.

A user may define one of the multiple NICs, such as NIC 16A, to operate as a primary adapter to the network 14 and the other two NICs, 16B and 16C, to operate as secondary network adapters. Accordingly, the resource controller 34 gives NIC 16A the highest priority when allocating network resources 21.

For example, each one of the multiple NICs 16A–16C may represent an interface to a different network. The first NIC 16A may connect to a company engineering department network, the second NIC 16B may connect to the company accounting department network, and the third NIC 16C may connect to the company marketing department network.

The engineering department may use a larger amount of network bandwidth than the accounting or marketing department. The resource controller 34 designates the engineering department network (NIC 16A) as having highest priority. The accounting NIC 16B rarely requests large files from the host computer 12. Because the accounting department rarely requires the server to transmit large bursts of packets, less TX memory 24 is allocated to the NIC 16B. The resource controller 34 effectively limits the amount of network traffic bandwidth allocated to the accounting network NIC 16B by allocating only a limited amount of network resources 21. The resource controller 34 increases the amount of bandwidth allocated to the engineering department network by allocating a majority of the network resources 21 first to the engineering department network NIC 16A. Any network resources 21 that become available in the future are given highest allocation preference to NIC 16A. The resource controller 34 can also use the expert system 33 (FIG. 3) to monitor and predict the network traffic patterns for any one or all three of the NICs 16A–16C.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for dynamically allocating memory in a network processing device, comprising:
    allocating an amount of the memory used for receiving data in the network processing device;
    allocating an amount of the memory used for transmitting data from the network processing device;
    monitoring a pattern of a number of transmitted and received network packets in the network processing device;
    dynamically reallocating between a larger amount of memory allocated for receiving data and a larger amount of memory allocated for transmitting data according to the monitored pattern of the number of transmitted and received network packets;
    predicting future patterns of the number of transmitted and received network packets from the monitored pattern of the number of transmitted and received network packets; and
    reallocating the memory between a transmit buffer and a receive buffer according to the predicted future patterns of the number of transmitted and received network packets.

2. A method according to claim 1 wherein dynamically reallocating the memory includes:
    identifying a first transmit path or receive path in the network processing device that needs additional memory;
    removing at least some of the memory currently allocated to a second transmit path or receive path; and
    reallocating the memory removed from the second transmit path or receive path to the first transmit path or receive path.

3. A method according to claim 1 wherein dynamically reallocating the memory includes:
    moving at least a portion of the memory allocated to the first receive path or transmit path to a memory resource pool; and
    reallocating memory in the resource pool to the second receive path or transmit path.

4. A method according to claim 1 including the following:
    determining whether a first time slice of the monitored pattern of the number of transmitted and received network packets matches an earlier stored time slice from a previously monitored pattern of the number of transmitted and received network packets; and
    reallocating the memory according to a pattern consequence of the earlier stored time slice when the first time slice matches the earlier stored time slice.

5. A method according to claim 4 including the following:
    identifying a second time slice in the monitored pattern of the number of transmitted and received network packets that follows the first time slice;
    storing the second time slice as the pattern consequence of the first time slice when the first time slice matches the earlier stored time slice; and
    reallocating the memory according to the pattern consequence of the first time slice when time slices of later patterns of the number of transmitted and received network packets match the first time slice.

6. A method according to claim 4 including storing the first time slice as a matchable pattern when the first time slice does not match any currently known pattern of the number of transmitted and received network packets.

7. A method according to claim 6 including reallocating the memory only when the first time slice indicates heavy network usage in only one of a transmit path or receive path.

8. A method according to claim 1 wherein the memory comprises network processing device memory.

9. A method according to claim 1 including the following:
    providing multiple network interfaces in the network processing device;
    monitoring network traffic patterns for each one of the multiple network interfaces; and
    dynamically reallocating the memory between the multiple network interfaces according to the monitored network traffic patterns.

10. A method according to claim 9 including the following:

assigning one of the multiple network interfaces as a primary network interface device; and giving the primary network interface device highest priority when dynamically reallocating the memory.

11. A network processing device, including:

a network interface for receiving packets and transmitting packets;

a memory including a receive portion used by the network interface for receiving packets and a transmit portion used by the network interface for transmitting packets;

a processor that monitors patterns of a number of transmitted and received network packets over the network interface and dynamically reallocates amounts of memory allocated to the receive portion and the transmit portion according to the monitored transmitting and receiving traffic patterns, wherein the processor includes an expert system that reallocates a larger amount of memory between the receive portion and the transmit portion according to predicted patterns of the number of transmitted and received network packets.

12. A network processing device according to claim 11 wherein the processor runs a network protocol stack and a network interface driver that transmit and receive packets according to the amount of memory allocated in the receive portion and transmit portion.

13. A network processing device according to claim 12 wherein the processor maintains a resource pool identifying an amount of the memory available for transmitting and receiving packets, the processor dynamically reallocating memory to and from the resource pool, the receive portion, and the transmit portion according to the monitored traffic patterns.

14. A network processing device according to claim 11 wherein a portion of the memory is used by the expert system to store time slices of previous patterns of the number of transmitted and received network packets and to store pattern consequences for the previously stored time slices, the expert system predicting the patterns by matching time slices of currently monitored patterns with the stored time slices and then reallocating the receive portion and transmit portion of the memory according to the pattern consequences for the matching stored time slices.

15. A network processing device according to claim 11 including multiple network interfaces that are each dynamically allocated sections of the memory for receiving packets and transmitting packets according to patterns of the number of transmitted and received network packets in the multiple network interfaces.

16. A network processing device according to claim 11 wherein the network interface comprises an Ethernet interface card.

17. A computer program for use with a network processing device, said computer program, comprising:

a statistic monitoring agent for monitoring a number of transmitted and received network packets in the network processing device;

a transmit module for adding and removing memory for a transmit path of the network processing device;

a receive module for adding and removing memory for a receive path of the network processing device;

a resource controller that dynamically controls an amount of memory the transmit module adds and removes for the transmit path and an amount of memory the receive module adds and removes for the receive path according to the number of transmitted and received packets monitored by the statistic monitoring agent; and system that predicts future patterns of the number of transmitted and received network packets in the network processing device according to the monitored number of transmitted and received network packets, the resource controller allocating memory to the transmit path and receive path according to the predicted future patterns.

18. A computer program according to claim 17 including a resource pool that identifies memory available for the transmit path and receive path, the resource pool dynamically allocated and deallocated to the transmit path and receive path according to the number of transmitted and received network packets.

19. A computer program according to claim 17 wherein the resource controller dynamically allocates the memory for multiple network interface cards in the network processing device.

* * * * *